Jan. 19, 1965  R. M. SHERMAN  3,166,290
GATE FOR USE IN IRRIGATION GATE LINES AND THE LIKE
Filed Sept. 12, 1963  2 Sheets-Sheet 1

INVENTOR.
ROGER M. SHERMAN
BY
Flehr and Swain
ATTORNEYS.

Jan. 19, 1965     R. M. SHERMAN     3,166,290
GATE FOR USE IN IRRIGATION GATE LINES AND THE LIKE
Filed Sept. 12, 1963                    2 Sheets-Sheet 2

INVENTOR.
ROGER M. SHERMAN
BY
Flehr and Swain
ATTORNEYS.

United States Patent Office 3,166,290
Patented Jan. 19, 1965

3,166,290
GATE FOR USE IN IRRIGATION GATE LINES AND THE LIKE
Roger M. Sherman, Palo Alto, Calif., assignor to Hiller Engineering Corporation, San Jose, Calif., a corporation of California
Filed Sept. 12, 1963, Ser. No. 308,457
5 Claims. (Cl. 251—145)

This invention relates to gates and more particularly to use of gates in irrigation gate lines and the like, for permitting selective passage of water from the interior of the pipeline to the exterior through the wall of the pipe rather than through the end.

In many forms of agriculture it is frequently necessary to irrigate crops by passing water through furrows, that is, between the individual rows of the crop and to permit water to pass from the line into each of the individual furrows through openings in the side wall of the pipe. In order to control through which, if any, of the openings water is to pass and to control the amount of flow, gates or valves are installed in each of the openings. It is apparent then that the individual valves must be capable of closing completely under both high and low pressure and also must be capable of adequately controlling the flow through the openings in the pipe.

Another criterion is apparent when it is realized that the gate lines are frequently removed from one field and transported to another. The gate lines are ordinarily made up of separable pipe lengths of approximately twenty, thirty or forty feet which can be loaded onto trucks. Each length of pipe includes a number of valves along the side wall thereof which are spaced corresponding to the distance between rows of crops. As the lines are loaded onto the truck they are usually slid axially with respect to each other with consequent damage to individual gates which extend radially from the pipe. This problem has been overcome to some degree in the past by welding the valves to the interior of the irrigation gate line. Such fabrication, however, is not feasible since it is frequently desired to replace individual ones of the gates. With welded gates such replacement is not easily accomplished in the field but the entire length of line must be returned to a shop. Other gates of the prior art require rectangular or irregular holes in the pipe whereby installation must be done in a shop.

It is therefore, a general object of this invention to provide an improved gate for irrigation gate lines and the like.

It is a more particular object of this invention to provide an improved gate for irrigation gate lines, which gates may be located in simple round holes.

It is another object of this invention to provide an improved gate of the aforementioned character further characterized in that individual gates are relatively flush with the periphery of the irrigation line itself whereby interference between two or more gates is held at a minimum when the lines are slid axially with respect to each other.

It is another object of this invention to provide an improved gate of the aforementioned character which is lock tight at all pressures and which is adaptable to economical and non-corrosive construction of plastic material such as Delrin.

The above and other objects and features of the invention will become more clearly apparent upon a review of the following description in conjunction with the accompanying drawing, in which.

Figures 1, 3:
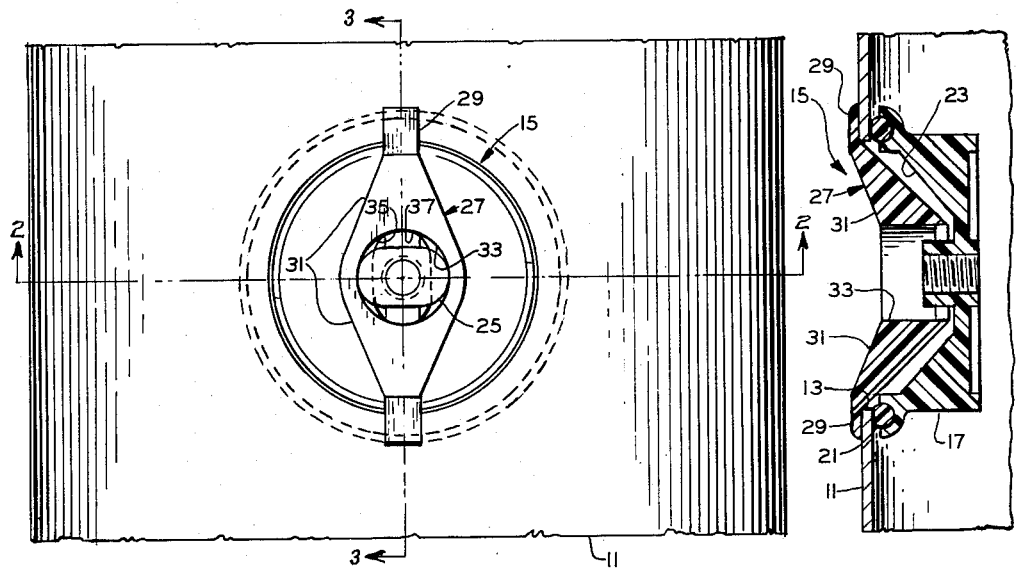
FIGURE 1 is a top plan view of a portion of an irrigation gate line showing a gate in accordance with one embodiment of the invention.
FIGURE 3 is a sectional view along the line 3—3 of FIGURE 1.

Referring to the drawings there is shown a portion 11 of an irrigation gate line having a circular opening 13 in the side wall thereof. A gate 15 in accordance with the invention is retained within the opening 13 by means of a twist lock to be described hereinafter.

Figure 2:
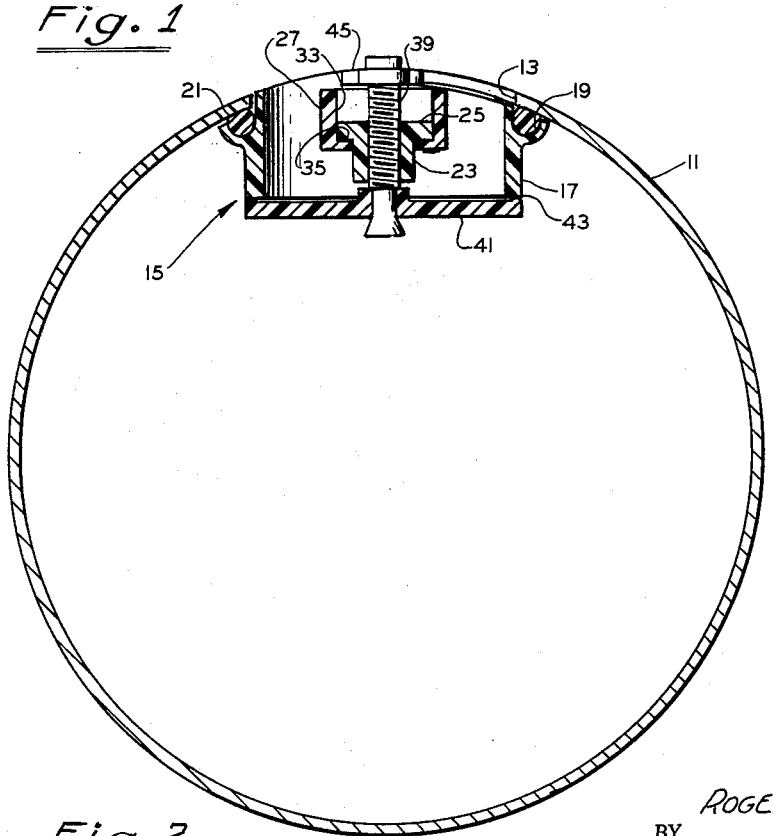
FIGURE 2 is a sectional view along the line 2—2 of FIGURE 1.
Figure 4:
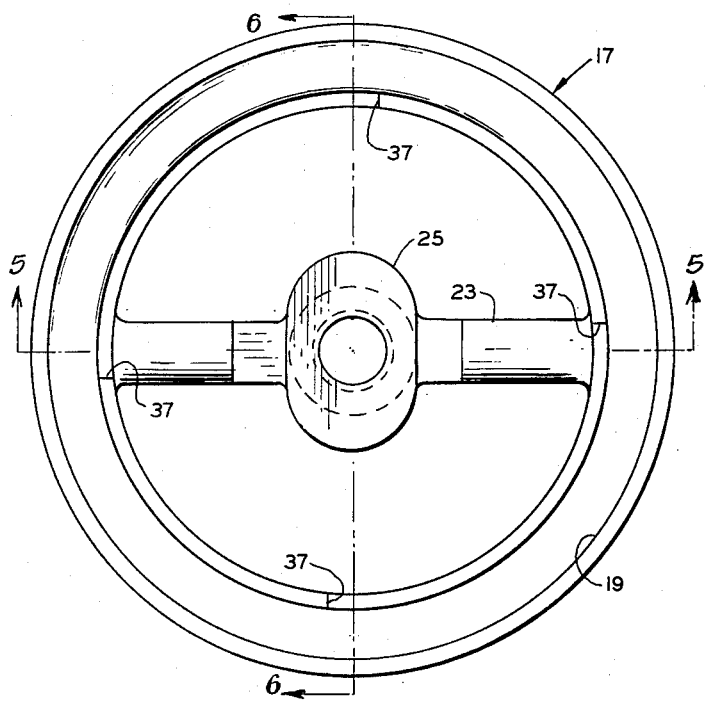
FIGURE 4 is a top plan view of the body member of that gate shown in FIGURE 1.
Figure 5:
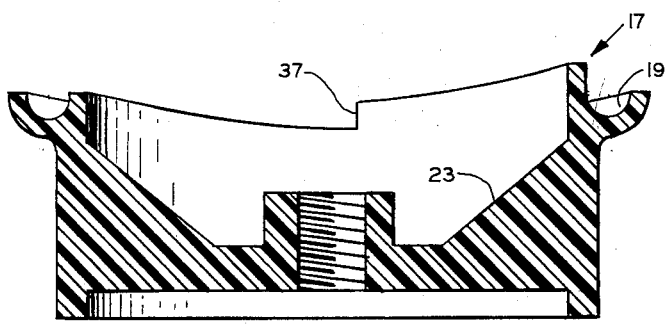
FIGURE 5 is a sectional view taken along the line 5—5 of FIGURE 4.
Figure 6:
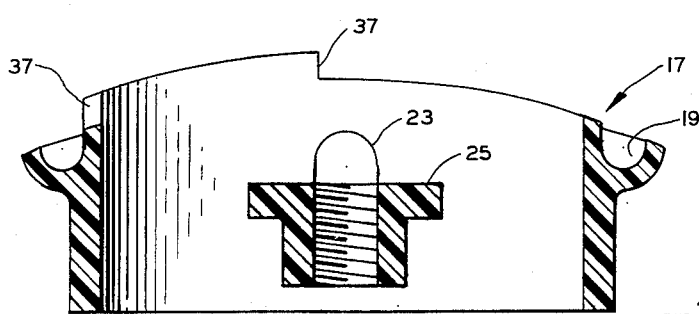
FIGURE 6 is a sectional view taken along the line 6—6 of FIGURE 4.

The gate 15 includes a cylindrically shaped body 17 shown in detail in FIGURES 4, 5 and 6. The body member includes a sealing ring groove 19 which, as can be seen in FIGURE 2, is of greater diameter than the opening 13. An O-ring 21 is positioned within the groove 19 and against the inside of the gate line 11 about the opening 13.

In order to secure the gate within the pipe line, locking means are provided including a first portion integral with the body member itself and a second portion to be described hereinafter which is separable from the body member. The first locking member integral with the body member 17 includes a web 23 formed integrally with the cylindrical walls of the body member. An oblong flange 25 is formed as a part of the web 23 and lies in a plane substantially transverse to the cylindrical walls of the body member. As is the nature of an oblong member, the dimension in one direction, the major axis, is greater than the dimension in a transverse direction, the minor axis.

The second locking member 27 can be seen more clearly in FIGURES 1, 2 and 3. This member is of somewhat resilient material, such as Delrin and includes wings 29 at the extremities thereof and downwardly extending arms 31. The downwardly extending arms 31 join at the center of the second locking member and a circular bore 33 is provided at this juncture. The circular bore 33 extends only partially through the second locking member 27 such that the shoulder 35 is provided at the base thereof. The shoulder 35 is pierced with an oblong opening 37 having a shape substantially similar to the oblong shaped flange 25 of the first locking member. For convenience, however, the opening 37 may be slightly larger than the flange 25.

In order to secure the gate 15 to the opening 13 of the gate line, the body member 17 is positioned adjacent the opening 13 in the interior of the line. The second locking member 27 is then positioned on the outside of the gate line with its opening 37 in alignment with the oblong flange 25 such that the position of the second locking member is at right angles to that shown in FIGURE 1. The second locking member 27 then is lowered until the shoulder 35 lies below the flange 25 of the first locking member and the second locking member is then turned to the position shown in FIGURE 1, whereby the resilient nature of the second lock member maintains the gate in position. In order to prevent overturning the second locking member with respect to the first, the cylindrical walls of the body member 17 are provided with shoulder stops 37.

In order to control the flow of water through the gate thus far described, a shaft 39 (for the sake of clarity, not shown in FIGURES 1 and 3) is threadably received by the first locking member. A plate 41 is secured to the lower portion of the shaft 39 and includes at its periphery a seat 43 in alignment with the lower portion of the cylindrical body member 17. A handle 45 is secured to the upper portion of the shaft 39 such that the shaft may be conveniently rotated. It is apparent that the plate 41 may be moved toward or away from the body member 17 to selectively permit or prevent passage of fluid from the interior of the gate line 11 to the exterior thereof.

Thus, it is seen that an improved gate adapted for use in irrigation pipe lines has been provided wherein only the wings 29 thereof extend beyond the periphery of the gate line itself. Thus as a number of separable gate line lengths are stacked within a truck, little or no obstruction by the various gates themselves is produced and the possible damage to the individual gates are thereby reduced. Moreover, even if damage should occur it is only to the relatively inexpensive second locking member.

I claim:

1. A gate adapted for use in an irrigation gate line of the type including an elongated pipe having at least one opening through the wall thereof, said gate comprising a cylindrical body member, the periphery of said body member being greater than that of the opening, sealing means at one end of said body member adapted to be positioned against the interior of said elongated pipe about the opening therein, a first lock member secured within said body member, said first lock member having a first and a second dimension in a plane transverse to said cylindrical body member, said first dimension being greater than said second dimension, a second lock member disposed about said first lock member, said second lock member including a pair of arms having end portions overextending said sealing means and adapted to be positioned against the exterior of said elongated pipe adjacent the opening therein, said second lock means defining an opening, the dimension of said opening corresponding to said first and second dimensions of said first lock member whereby said first and second lock members may be selectively released and secured together by relative rotation therebetween, and plate means in selective engagement with the other end of said body member for selectively opening and closing communication from the interior of said elongated pipe through said body member.

2. A gate adapted for use in an irrigation gate line of the type including an elongated pipe having at least one opening through the wall thereof, said gate comprising a cylindrical body member having a periphery greater than that of said opening, sealing means at one end of said body member adapted to be positioned against the interior of said pipe about the opening therein, a twist lock, said cylindrical body member including a first portion of said twist lock, a second portion of said twist lock having outwardly extending wings adapted to be positioned on the exterior of said pipe and shoulders adapted to be retained by the first portion of the twist lock, and plate means in selective engagement with the other end of said body member for selectively opening and closing communication from the interior of said elongated pipe through said body member.

3. A gate as defined in claim 2 wherein said second portion of the twist lock is resilient.

4. A gate as defined in claim 2 wherein said opening through the wall of the pipe is round.

5. A gate as defined in claim 2 wherein said gate is formed of plastic material.

References Cited by the Examiner
UNITED STATES PATENTS
3,033,514  5/62  Grosch _____ 251—145

M. CARY NELSON, *Primary Examiner*.